United States Patent
Lee et al.

(10) Patent No.: US 7,181,164 B2
(45) Date of Patent: Feb. 20, 2007

(54) BATTERY MODEM USING SHORT RANGE WIRELESS TECHNOLOGY

(75) Inventors: Sung-Sub Lee, Kyungki-do (KR); Gab-Ju Jung, Seoul (KR)

(73) Assignee: Scoby Electronics Co., Ltd., Kyungki-do (KR)

( * ) Notice: Subject to any disclaimer, the term of this patent is extended or adjusted under 35 U.S.C. 154(b) by 134 days.

(21) Appl. No.: 11/035,497

(22) Filed: Jan. 14, 2005

(65) Prior Publication Data

US 2006/0089177 A1    Apr. 27, 2006

(30) Foreign Application Priority Data

Oct. 21, 2004  (KR)  ...................... 10-2004-0084214

(51) Int. Cl.
*H04B 5/00* (2006.01)
*H04B 1/38* (2006.01)
*G05B 11/01* (2006.01)

(52) U.S. Cl. .................. 455/41.2; 455/575.7; 455/270; 340/310.11

(58) Field of Classification Search ........ 455/418–420, 455/41.1, 41.2, 41.3, 68, 557, 572–573, 575.7, 455/129, 269, 270, 352–355; 340/310.01, 340/310.11
See application file for complete search history.

(56) References Cited

U.S. PATENT DOCUMENTS

| 5,710,458 A    * | 1/1998 | Iwasaki ...................... 257/679 |
| 2005/0088281 A1* | 4/2005 | Rohrberg et al. .......... 340/5.71 |
| 2005/0113054 A1* | 5/2005 | Lee ............................. 455/270 |

FOREIGN PATENT DOCUMENTS

JP    02005323249 A  * 11/2005

\* cited by examiner

*Primary Examiner*—Nguyen T. Vo
(74) *Attorney, Agent, or Firm*—Fish & Richardson P.C.

(57) ABSTRACT

The present invention is directed to a battery modem using Short Range Wireless technology. A battery modem using a short range wireless technology in a data communication apparatus capable of performing wired/wireless data communication depending on whether a battery is mounted therein, wherein the battery modem detects base band communication data from a power supply line of the data communication apparatus on the basis of the short range wireless technology and a power line modem scheme, converts the data into an RF signal and transmits the RF signal to a data communication apparatus of the other party through a power supply line antenna, and the battery modem receives the RF signal from the power supply line antenna, converts the RF signal into the communication data and outputs the data to the data communication apparatus.

6 Claims, 5 Drawing Sheets

BATTERY MODEM USING SHORT RANGE WIRELESS TECHNOLOGY

BACKGROUND OF THE INVENTION

1. Field of the Invention

The present invention relates to a battery modem using Short Range Wireless (referred to as "SRW", hereinafter) technology, and more specifically to a battery modem using the SRW technology consisting of a standard size RF battery containing a wireless transceiver module and a battery. Korean Patent Application No.2003-0083545, entitled "RF battery having wireless transceiver module" (hereinafter, referred to as 'prior invention'), previously filed by the applicant of the present invention, is embodied as a battery modem shaped like a battery but consisting only of a wireless transceiver module, and the battery modem based on the SRW technology and a power line modem scheme together with a power supply battery are mounted on a battery receiving case of a data communication apparatus so that high speed wireless data communication can be performed between data communication apparatuses.

2. Description of the Related Art

The RF battery according to the prior invention embodies the standard size of RF battery by integrating the wireless transceiver module for transmitting and receiving RF signals with a battery for power supply; detects transmission of data from a power supply line of the wireless data communication apparatus on which the RF battery is mounted on the basis of the power line modem scheme, converts the data into an RF signal, and transmits the RF signal through the power supply line which serves as the antenna; and detects an RF signal received through the antenna, converts the RF signal into communication data and performs a functional operation corresponding to the communication data in the wireless data communication apparatus.

When the prior invention described above integrates the wireless transceiver module in the RF battery and the battery fixedly or detachably, in the case that the RF battery is a standard size, for example, a general AAA battery, the wireless transceiver module is embodied in the size of ⅓ AAA, and the battery in the size of ⅔ AAA, respectively.

That is, the wireless transceiver module and the battery were designed such that it was necessary that they be integrated such that their combined size corresponded to that of a standard battery.

However, this configuration encounters a problem in that it is not easy to fit all of the circuitry for a wireless transceiver module based on the power line modem scheme into a narrow size of ⅓ AAA as described above.

Recently, meanwhile, development of home network systems designed for home automation is actively in progress. Home network systems are designed to network information appliances present within the home with each other, so that they may share information with one another, serves to connect the home network to the outside would such that the information of all the information appliances can be determined remotely, and allows information terminals to remotely control the information appliances. However, the fact is that the home network system requires a wide degree of compatibility for integration and interoperation between different pieces of equipment since a variety of expensive and advanced digital information appliances, as well as analog equipment, may be present in any given residence.

SUMMARY OF THE INVENTION

It is, therefore, an object of the present invention to provide a battery modem utilizing SRW technology wherein a battery modem shaped like a dummy battery based on the SRW technology supporting a Wireless Personal Area Network (referred to as 'WPAN', hereinafter) and a Wireless Local Area Network (referred to as 'WLAN', hereinafter) and a power line modem scheme where a power supply line is used in common is embodied, and the battery modem and a power supply battery are mounted on a battery receiving case of a data communication apparatus so that high speed wireless data communication can be performed between data communication apparatuses.

It is another object of the present invention to provide a battery modem using SRW technology wherein the battery modem and a power supply battery are mounted in a battery receiving case of a remote control unit and then a plurality of controlled apparatuses in a home network system for home automation can be automatically remote controlled through the remote control unit.

According to an aspect of the present invention, there is provided a battery modem using short range wireless technology in a data communication apparatus capable of performing wired/wireless data communication depending on whether a battery is mounted therein, wherein the battery modem detects base band communication data from a power supply line of the data communication apparatus on the basis of the short range wireless technology and a power line modem scheme, converts the data into an RF signal and transmits the RF signal to a data communication apparatus of the other party through a power supply line antenna, and the battery modem receives the RF signal from the power supply line antenna, converts the RF signal into communication data and outputs the data to the data communication apparatus.

BRIEF DESCRIPTION OF THE DRAWINGS

Other objects and aspects of the present invention will become more apparent from the following description of the embodiments with reference to the accompanying drawings in which.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the scope of the invention to those skilled in the art. Like numerals refer to like elements throughout the specification.

Hereinafter, the construction and operation of a battery modem using SRW technology in accordance with the present invention will be described in conjunction with the accompanying drawings.

Figure 1:
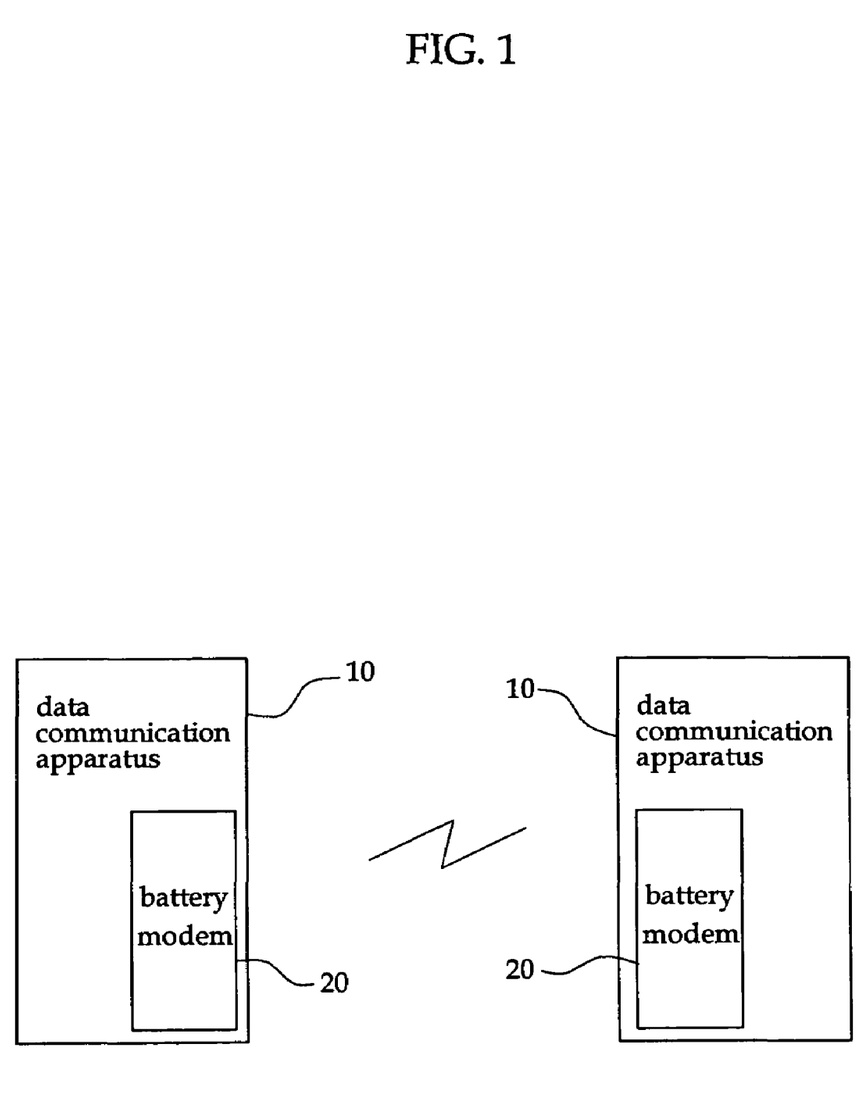
FIG. 1 is a block constructional diagram of interactive wireless communication between data communication apparatuses on which a battery modem using a short-range wireless technology in accordance with the present invention is mounted.

FIG. 1 is a block constructional diagram of interactive wireless communication between data communication apparatuses on which a battery modem using SRW technology in accordance with the present invention is mounted. Referring to FIG. 1, a data communication apparatus 10 capable of wired/wireless data communication and infrared communication according to whether or not a battery is mounted therein, mounts a battery modem 20 performing transmission and reception of wireless data on the basis of the SRW technology and a power line modem scheme in a battery receiving case. The battery modem 20 is embodied as a dummy battery that can be mounted in the battery receiving case so that it detects base band communication data from a power supply line of the data communication apparatus 10 on the basis of the SRW technology and the power line modem scheme, converts the data into an RF signal and transmits the RF signal to a data communication apparatus of the other party through a power supply line antenna. On the contrary, the battery modem 20 receives the RF signal from the power supply line antenna, converts the RF signal into communication data and outputs the data to the data communication apparatus 10 so that wireless data communication of the RF signal is interactively performed between data communication apparatuses 10.

Here, if the data communication apparatus 10 is a remote control unit, and the data communication apparatus of the other party is a plurality of controlled apparatuses (for example, electronic equipment that is subjected to control, such as TVs, VCRs, PCs, printers, mobile equipment, MP3s, and the like), a battery modem 20 in the remote control unit detects communication data used to perform remote control from the power supply line of the remote control unit on the basis of the SRW technology and the power line modem scheme, converts the data into an RF signal and outputs the RF signal to a corresponding controlled apparatus of the other party through the power supply line which serves as the antenna.

Then, the battery modem in the corresponding controlled apparatus detects the RF signal received through the antenna (power supply line) on the basis of the SRW technology and the power line modem scheme, converts the RF signal into communication data, and outputs the data to the control unit through the power supply line so that a corresponding operation according to the communication data is remotely performed in the corresponding controlled apparatus.

Here, the SRW technology is a technology capable of providing wireless connection and communication service between equipment in a local area such as a home, a house, an office and the like. The SRW technology provides a low-cost and low power consumption communication service among equipment placed nearby, up to a maximum of 100 m, at a speed of 10 to 100 Mbps.

The SRW technology described above may be divided into a WPAN that enables various application services to be created by wirelessly connecting the computer and peripheral equipment, mobile phone, appliances, and the like, present within a short range of 10 m and supporting communication among equipment, and a WLAN that aims at providing a higher transmission speed and a wider service region such that the cost and the power consumption are higher compared to the WPAN.

The present invention provides integration, interoperability and compatibility between different types of data communication equipment by applying a transmission speed, a transmission distance, a frequency band, a modulation scheme, and the like that are standardized or are being standardized in the SRW technology supporting the WPAN and WLAN described above and embodying the battery modem 20 performing signal conversion between base band communication data and an RF signal and RF signal transceiving.

The power line modem scheme is a scheme where a communication signal is converted into a high frequency signal of several tens of KHz to several hundreds of MHz, which is then transmitted over an existing power supply line together with the power supply, and the communication signal is separated and received through a high frequency filter. In accordance with the present invention, communication data existing in the power supply line of the data communication apparatus 10 is detected and converted into an RF signal using the power line modem scheme described above.

For example, in the case that the data communication apparatus 10 is an apparatus for performing infrared communication, a carrier signal of 30 to 60 KHz is necessary in order to transmit communication data. Further, since the carrier signal of 30 to 60 KHz corresponding to such communication data is loaded on the power line as a form of noise, the data communication apparatus 10 detects the communication data by extracting the carrier signal, converts the RF control data corresponding to the communication data into an RF signal and wirelessly transmits the RF signal through the power supply line of the data communication apparatus 10 that operates as an antenna.

In the case of reception, also, the data communication apparatus 10 detects the RF control data from the RF signal received through the power line of the data communication apparatus 10 and receives communication data corresponding to the RF control data. Here, the battery modem 20 in accordance with the present invention can perform bi-directional transmission and reception of wireless data as well as unidirectional transmission or reception.

The battery modem 20 can perform transmission and reception of the RF signal without any interference of external signals or obstacles since a power supply line arranged in the outer portion of the data communication apparatus 10 is used as the antenna for transmitting and receiving the RF signal.

Figure 2A:
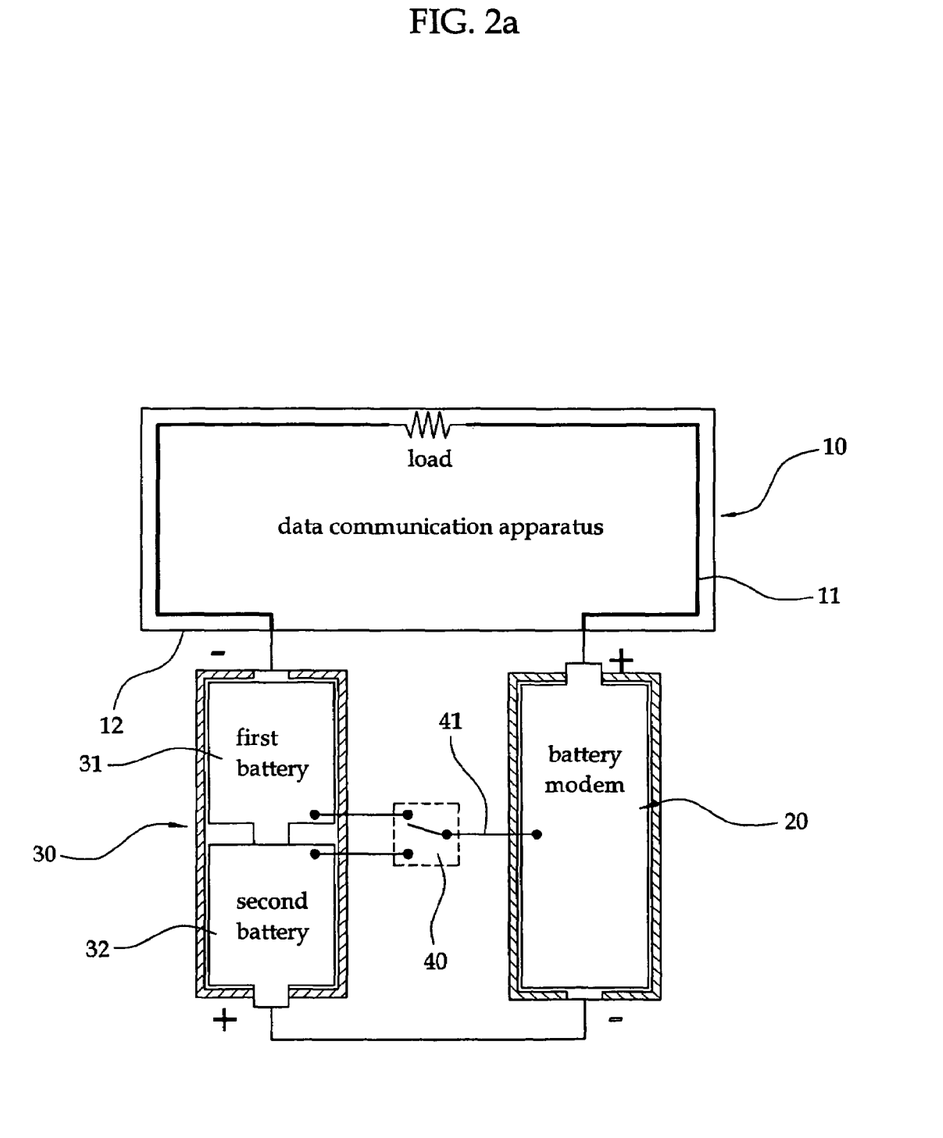
FIG. 2a is a view showing a parallel connection form between a battery modem of the present invention and a power supply battery and a power supply line connection state.
Figure 2B:
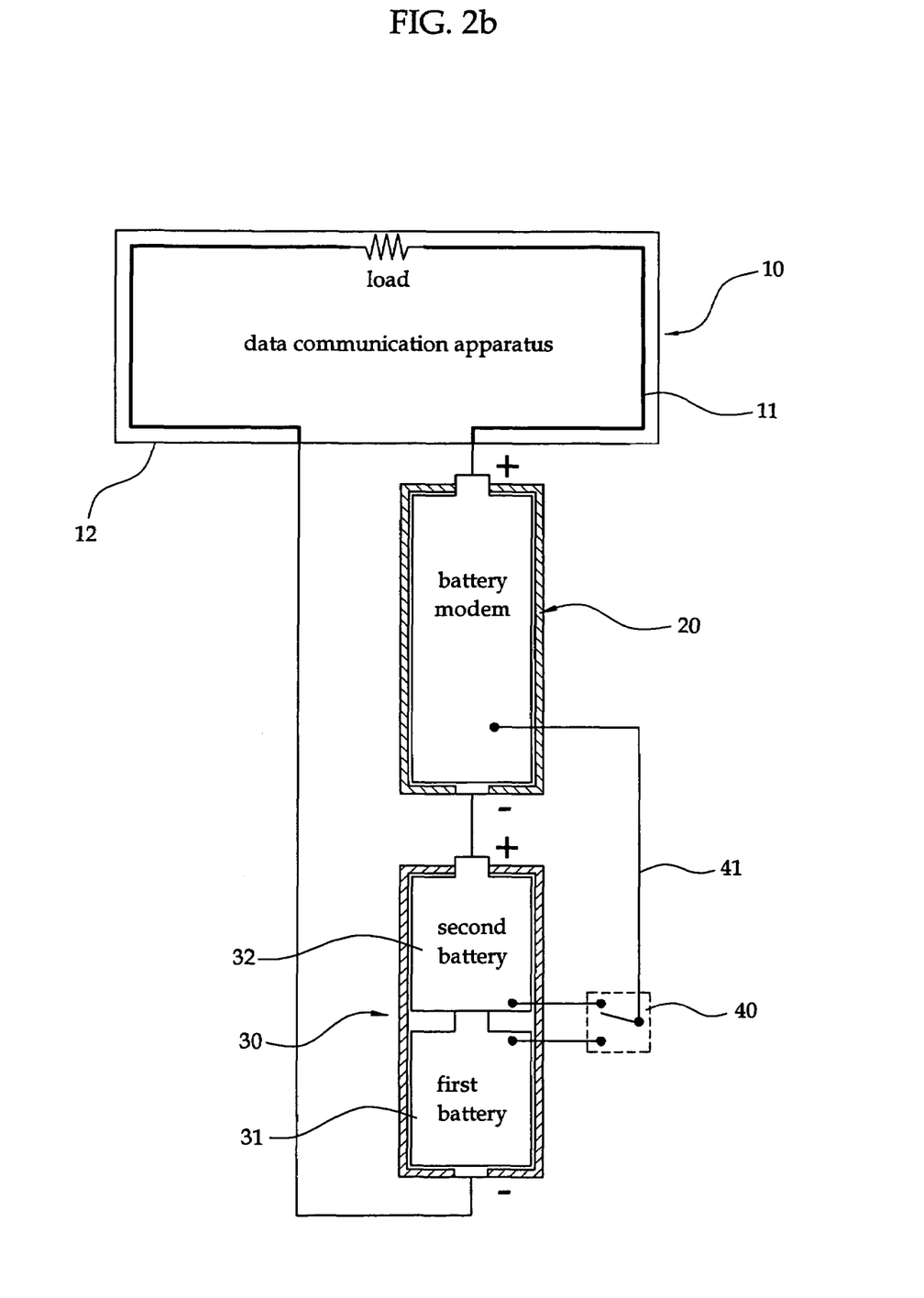
FIG. 2b is a view showing a serial connection formed between the battery modem and the power supply battery and a power supply line connection state.

FIG. 2a is a view showing a parallel connection form between the battery modem of the present invention and a power supply battery and a power supply line connection state, and FIG. 2b is a view showing a serial connection form between the battery modem and the power supply battery and a power supply line connection state, which is also a concept view showing an antenna effect using a power supply line.

As shown in FIGS. 2a and 2b, the data communication apparatus 10 has the battery modem 20 and a separate power supply battery 30 used to supply the data communication apparatus 10 and the battery modem 20 with power, power supply terminals of the battery modem 20 and the power supply battery 30 are connected to a power supply terminal of the data communication apparatus 10, and the power supply terminals are connected to the outer portion of the data communication apparatus 10, that is, a power supply line 11 of a PCB 12 pattern of the data communication apparatus 10

Therefore, the battery modem 20 uses a power supply line of the data communication apparatus 10 that is formed by connecting the power supply terminals of the battery modem 20 and the power supply battery 30 to the power supply line of the data communication apparatus 10, as an antenna for transmitting and receiving the RF signal.

Meanwhile, the power supply battery 30 is comprised of two low capacity batteries, that is, a first battery 31 and a second battery 32, which are suitable to a battery receiving case of a general standard size that is included in the data communication apparatus 10 and are used to adjust a supply voltage capacity by supplementing insufficient voltage. At this time, the power supply battery 30 is connected to the battery modem 20 in parallel connection form (FIG. 2*a*) or in serial connection form (FIG. 2*b*).

While the battery modem 20 embodied in a dummy battery form receives (+) power supply from the power supply battery 30, it further includes a contact terminal 41 and a switch 40 for selecting a battery voltage so that the contact terminal 41 contacts the first battery 31 and the second battery 31 through the switch 40 and the battery modem 20 is provided with (−) power from each of batteries 31 and 32 and is operated thereby.

Figure 3:
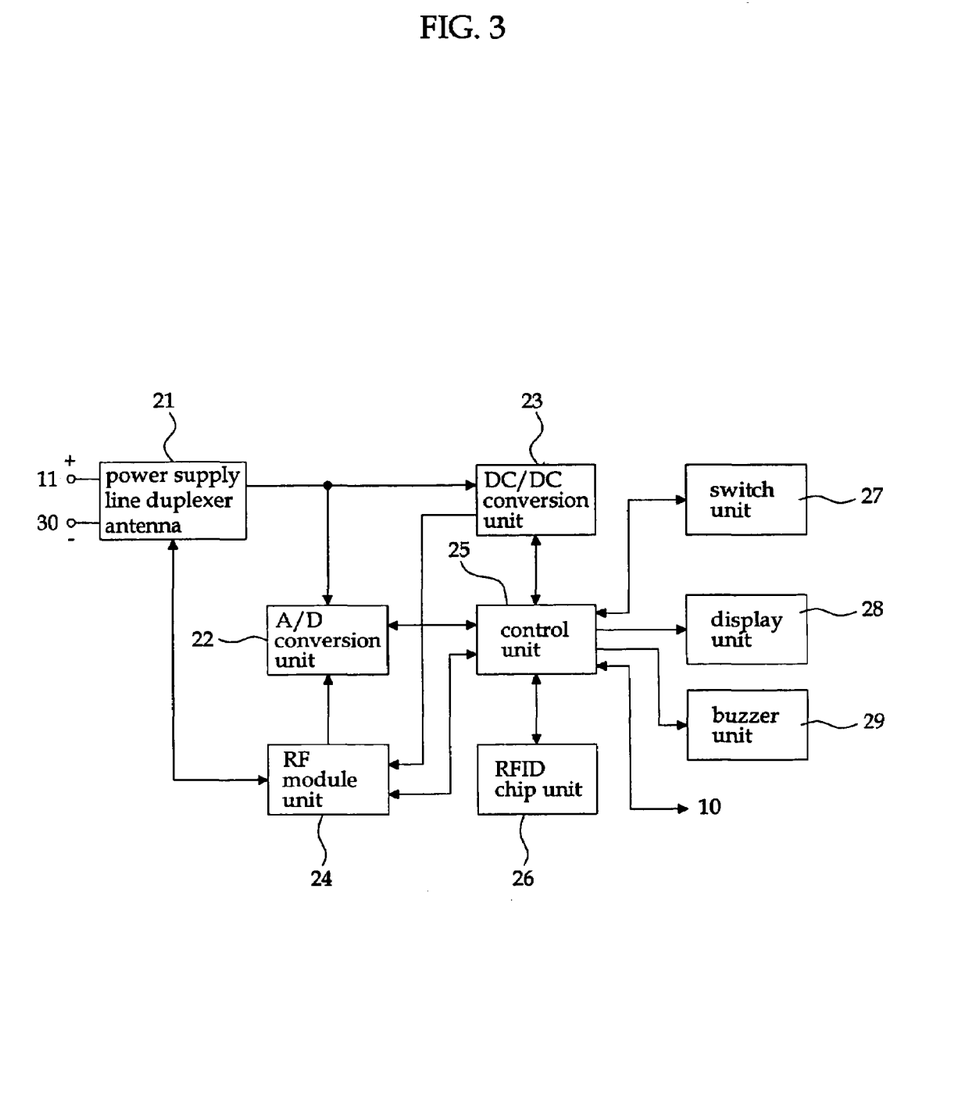
FIG. 3 is a block constructional diagram of a battery modem using short-range wireless technology in accordance with the present invention.

FIG. 3 is a block constructional diagram of a battery modem using SRW technology in accordance with the present invention. Referring to FIG. 3, the battery modem includes a power supply line duplexer antenna 21 consisting of a power line data conversion coupling coil and a DC blocking capacitor based on a power line modem scheme, for extracting a carrier signal used in the data communication apparatus 10 from the power supply line of the data communication apparatus 10, removing noise, detecting the communication data, performing high frequency impedance matching with respect to the RF signal, and wirelessly transmitting and receiving the RF signal; an A/D conversion unit 22 for converting communication data detected in the power supply line duplexer antenna 21 into a digital signal so as to output the signal to a control unit 25, which will be described later, or converting an RF signal outputted from an RF module unit 24, which will be described later, into an RF control data and ID signal that are digital signals so as to output the converted data and signal to the control unit 25; a DC/DC conversion unit 23 for increasing a voltage of the power supply battery 30 by a predetermined level; an RF module unit 24 for, the basis of the short range wireless technology that supports a wireless personal area network and a wireless local area network, converting the RF control data and the ID signal outputted from the control unit 25 into an RF signal, amplifying the RF signal by the predetermined level according to the voltage increased in the DC/DC conversion unit 23 and outputting the amplified signal to the power supply line duplexer antenna 21, or for amplifying the RF signal received through the power supply line duplexer antenna by a predetermined level according to the voltage increased in the DC/DC conversion unit 23, removing noise and outputting the noise removed signal to the A/D conversion unit 22; a control unit 25 for recognizing a carrier signal extracted from the power supply line duplexer antenna 21 as an enable signal for transmitting an RF signal and outputting RF control data corresponding to communication data outputted from the A/D conversion unit 22 together with an ID signal set in a switch unit 27, which will be described later, to the RF module unit 24, and outputting communication data corresponding to RF control data outputted from the A/D conversion unit 22 to a control unit of the corresponding data communication unit 10 according to whether or not the ID signal is identified; an RFID(Radio Frequency IDentification) chip unit 26 for storing ID signal information of each of data communication apparatuses set in a switch unit 27 and signal information in each of frequencies used in each of the data communication apparatuses and outputting the stored signal information through the antenna when receiving an effective frequency; a switch unit 27 for setting On/Off operation modes of the battery modem 20 and setting an ID signal to identify each of the data communication apparatuses; and a display unit 28 and a buzzer unit 29 for displaying and indicating whether or not the RF signal is transmitted.

Figure 4:
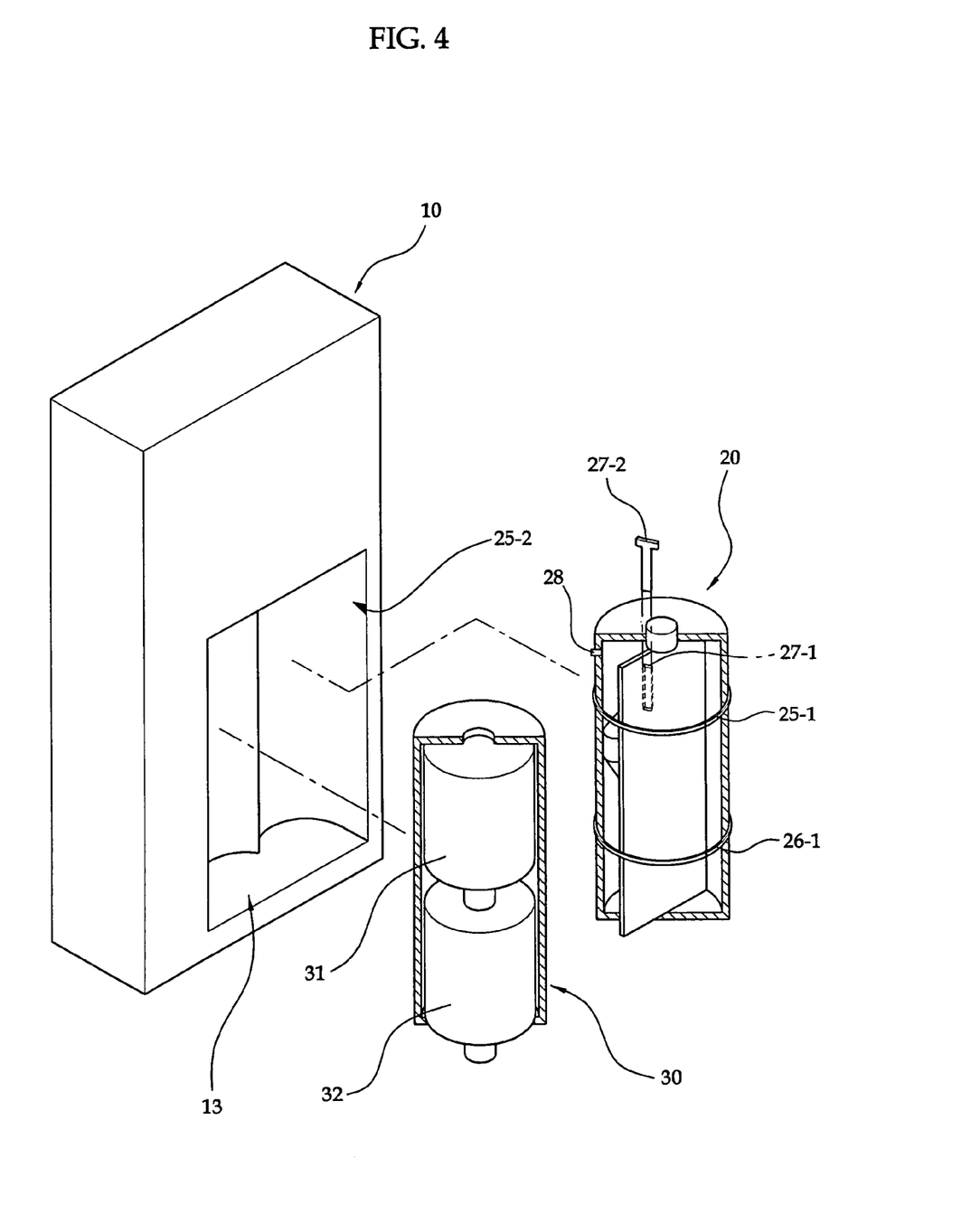
FIG. 4 is an overall perspective view of a battery modem and a power supply battery mounted in a battery receiving case of the data communication apparatus in accordance with the present invention.

FIG. 4 is an overall perspective view of a battery modem and a power supply battery mounted in a battery receiving case of the data communication apparatus in accordance with the present invention, where the battery modem 20 and the power supply modem 30 are attached to or detached from the general battery receiving case 13 included in the data communication apparatus 10, a switch insertion hole 27-1 used to play a function of the switch unit 27 is formed on the package upper surface of the battery modem 20 so that a switch 27-2 having a piercing shape such as a slide switch or a dip switch can be inserted into the insertion hole, and also the display unit 28 is formed.

A contact unit 25-1 such as a contact belt is formed on the package surface of the battery modem 20. The contact unit 25-1 is separately constructed to detect an enable signal used to transmit the RF signal in the battery modem 20, which is embodied to contact with an interrupt terminal 25-2 of a projection that protrudes from the battery receiving case 13 of the data communication apparatus 10.

Accordingly, in the case that arbitrary communication data is selected and outputted in the data communication apparatus 10, when an interrupt signal generated due to the communication data is applied to the contact unit 25-1 through the interrupt terminal 25-2, the contact unit 25-1 detects and outputs the interrupt signal to the control unit 25 as an enable signal used to transmit the RF signal.

If the contact unit 25-1 is formed as described above, the control unit 25 controls the contact unit 25-1 to output communication data directly.

An antenna having a belt shape formed on the package surface of the battery modem 20 is an antenna of the RFID chip unit 26, which has a construction to output signal information of the RFID chip unit 26. It receives an effective frequency of the RFID chip reading apparatus through the antenna 26-1 corresponding to the RFID chip reading apparatus driving the FFID chip unit 26 or outputs signal information of the RFID chip unit 26 when receiving the effective frequency.

The switch unit 27 sets the battery modem 20 to On operation mode using the switch having a piercing shape only in the case that the wireless data communication is needed, so that unnecessary power consumption is prevented, the battery modem 20 is protected, and an individual ID signal is set in each data communication apparatus.

The RF module unit 24 performs inter-conversion between the RF control data and the RF signal by applying the transmission speed, transmission distance, frequency band and modulation scheme that were standardized or are being standardized in the SRW technology which supports the WPAN and WLAN.

As the communication data and the corresponding RF control data are previously set using a conversion table and stored in the memory, the control unit 25 prevents the data communication apparatus 10 from malfunctioning by controlling the ID signal set by the switch unit 27 to be added to the RF control data and the RF signal to be transmitted.

At this time, by further including external memories in addition to the memory in the control unit 25, it is possible to store the ID signal set by the switch unit 27 or various kinds of data, and to control a backup function.

The display unit 28 consists of a light emitting diode (LED) display device, which displays red, yellow, or blue light depending on a charge state of the power supply battery 30 so that it indicates the charge state. Further, the display unit 28 operates to warn of a low voltage level as its color corresponds to the voltage and remaining charge of the power supply battery.

The buzzer unit 29 consists of an audible sound transmission speaker whose volume can be controlled, where a charge completion sound is generated when the power supply battery 30 is fully charged, a key tone is generated when an arbitrary operation button or key of the data communication apparatus 10 is manipulated, and a warning sound of a low voltage whose tones are different is generated, so that the remaining charge corresponding to the low voltage is indicated.

The display unit 28 and the buzzer unit 29 indicate the transmission completion of the RF signal with a display of LED display device and an audible sound caused by an audible sound transmission speaker.

The control unit 25 controls generation of audible sound generated by the audible sound transmission speaker of the buzzer unit 29 and performs a finder function with respect to the data communication apparatus 10 according to an output of control signal for the finder function.

Next, operation of the battery modem using the SRW technology in accordance with the present invention constructed as described above will be explained in detail.

Here, wireless interactive transmission and reception of the RF signal between the data communication apparatuses will be explained with reference to an example where a data communication apparatus is a remote control unit performing infrared communication, and a data communication apparatus for transmitting and receiving the RF signal to and from the remote control unit is a controlled apparatus.

First, when the battery modem 20 and the power supply battery 30 are mounted in the battery receiving case 13 of the remote control unit 10 and the contact terminal 41 of the battery modem 20 contacts the first and second batteries 31 and 32 in the power supply battery 30 through the switch 40, a power supply of the corresponding battery is supplied to the battery modem 20 and the remote control unit 10 as a direct current so that it is possible to operate the remote control unit.

In this situation, when a user pushes an arbitrary operation button or key of the remote control unit 10 to select and output corresponding communication data, the carrier signal is extracted from the power line of the remote control unit 10 through the power supply line duplexer antenna 21 in the battery modem 20, the noise is removed and then the communication data is detected.

At this time, the control unit 25 recognizes the carrier signal extracted from the power supply line duplexer antenna 21 as an enable signal used to transmit the RF signal. Or, if it is the case that the contact unit 25-1 is formed, since the interrupt signal occurred by the output of the communication data is applied to the contact unit 25-1 in the battery receiving case 13 through the interrupt terminal 25-2, the control unit 25 recognizes the interrupt signal as an enable signal.

Next, the control unit 25 enters an enable state for transmitting the RF signal by an enable signal occurred by the extraction of the carrier signal or an enable signal detected through the contact unit 25-1.

Therefore, the A/D conversion unit 22 in the battery modem 20 converts communication data detected by the power supply line duplexer antenna 21 into a digital signal, and outputs the digital signal to the control unit 25.

Then, the control unit 25 reads out the RF control data corresponding to the communication data from the conversion table where the communication data and the corresponding RF control data are previously set and outputs the data to the RF module unit 24.

At this time, the control unit 25 receives an ID signal used to identify the corresponding controlled apparatus set in the switch unit 27 and outputs the ID signal together with the RF control data to the RF module unit 24.

If it is the case that the contact unit 25-1 is formed, the control unit 25 may directly receive the communication data from the control unit of the remote control unit 10 through the contact unit 25-1 and output RF control data corresponding to the communication data to the RF module unit 24.

The DC/DC conversion unit 23 operates according to an enable signal of the control unit 25 to increase voltage of the power supply battery 30. For example, it increases a voltage of 1.2V to a voltage of 5V to determine an amplification level in the RF module unit 24, and particularly increases a wireless transmission output to have a remote characteristic.

Subsequently, the RF module unit 24 converts the RF control data and the ID signal corresponding to the communication data outputted from the control unit 25 into an RF signal, amplifies the RF signal by a predetermined level according to a voltage increased in the DC/DC conversion unit 23, and outputs the amplified signal to the power supply line duplexer antenna 21.

Accordingly, the RF signal is wirelessly transmitted to the corresponding controlled apparatus of the other party through the power supply line duplexer antenna 21 connected to the power supply line 11 of the remote control unit 10.

Meanwhile, the corresponding controlled apparatus of the other party receives the RF signal, detects the corresponding communication data from the received RF signal, and controls operation of the controlled apparatus.

That is, the RF module unit 24 in the battery modem 20 of the controlled apparatus amplifies the RF signal received through the power supply line duplexer antenna 21 by a predetermined level according to the voltage increased in the DC/DC conversion unit 23, removes noise and outputs the signal to the A/D conversion unit 22.

Then, the A/D conversion unit 22 converts the RF signal outputted from the RF module unit 24 into the RF control data and the ID signal that are digital signals and outputs the converted signals to the control unit 25.

Accordingly, the control unit 25 confirms whether or not the remote control unit 10 is the correct one by identifying the ID signal, and reads out the communication data corresponding to the RF control data from the conversion table, and outputs the communication data to the control unit of the controlled apparatus through the power supply line.

At this time, the control unit 25 may directly output the communication data to the controlled apparatus through the contact unit 25-1.

If the control unit 25 outputs the communication data to the controlled apparatus as described above, the controlled apparatus performs a selection operation according to the corresponding communication data.

Meanwhile, in the case that the data communication apparatus 10 is a communication apparatus which is handheld and movable, and performs wireless communication with various kinds of controlled apparatuses in a home network system based on home automation, when the antenna 26-1 of the RFID chip unit 26 in the battery modem 20 approaches an effective frequency range of an RFID chip readout apparatus unit included in the controlled apparatus and drives the RFID chip unit 26, the RFID chip unit 26 transmits ID signal information of the controlled apparatus that has been stored and signal information in each of the frequencies used in the controlled apparatus to the RFID chip reading apparatus through the antenna 26-1.

Therefore, the data communication apparatus 10 having the battery modem 20 in accordance with the present invention can integrally remote control various kinds of controlled apparatuses in a home network system in connection with a home network system such as a door open/close system, a security system, and the like.

As described above, one effect of the present invention is that it enables easy embodiment of a circuit of the entire wireless transceiver module based on short range wireless technology and a power line modem scheme since a battery modem is embodied in the size of a AAA battery and in a shape of dummy battery excluding a power supply battery compared with the fact that a conventional wireless transceiver module is embodied in the size of ⅓ AAA.

Also, another effect of the present invention is that it provides integrity, interoperability and compatibility between different types of data communication apparatuses by embodying a battery modem capable of performing conversion between communication data of a base band and an RF signal and a transceiving of the RF signal by applying a transmission speed, a transmission distance, a frequency band, a modulation scheme, and the like that were standardized or are being standardized in an SRW technology supporting a WPAN and a WLAN. Accordingly, it is possible to perform high speed wireless data communication between the different types of data communication apparatuses, and it is possible to remote control all controlled apparatuses at any time and in any place using a remote control unit by constructing a home network system based on a home automation as a complete wired/wireless network system and coupling the home network system with various application services.

What is claimed is:

1. A battery modem using a short range wireless technology in a data communication on apparatus as capable of performing wired/wireless data communication, wherein the battery modem detects base band communication data from a power supply line of the data communication apparatus on the basis of the short range wireless technology and a power line modem scheme, converts the data into an RF signal and transmits the RF signal to a data communication apparatus or the other party through a power supply line antenna, and the battery modem receives the RF signal from the power supply line antenna, converts the RF signal into the communication data and outputs the data to the data communication apparatus, wherein, in the case that a power supply battery used to supply power to the data communication apparatus and the battery modem is mounted in the battery receiving case, a battery is connected to the battery modem serially or in parallel, wherein the battery modem further includes a contact terminal used to contact the power supply batter so that the modem is supplied with (−) power, from the power supply battery, and wherein in the case that the power supply battery is constructed by connecting a first battery and a second battery serially, both being low capacity batteries, the battery modern further includes a switch for selecting a battery voltage, through which the contact terminal of the battery modem is contacted with the first or the second battery so that the battery modem is supplied with the (−) power supply.

2. The battery modem according to claim 1, wherein the battery modem is embodied in the form of a dummy battery in order that the modem can be mounted in a battery receiving case of the data communication apparatus.

3. The battery modem according to claim 1, wherein in the case that the battery modem and the power supply battery are mounted in the battery receiving case of the data communication apparatus, the battery modem uses a power supply line of an entire PCB pattern of the data communication apparatus that is formed by connecting the power supply line of the battery modem and the power supply battery and the power supply line of the data communication apparatus as an antenna for transceiving an RF signal.

4. The battery modem according to claim 1, wherein the battery modem includes:

a power supply line duplexer antenna consisting of a power line data conversion coupling coil and a DC blocking capacitor based on a power line modem scheme, for extracting a carrier signal from the power supply line of the data communication apparatus, removing noise, detecting communication data, performing high frequency impedance matching with respect to the RF signal, and wirelessly transceiving the RF signal;

an A/D conversion unit for converting communication data detected in the power supply line duplexer antenna into a digital signal so as to output the signal to a control unit, or converting an RF signal outputted from an RF module unit into an RF control data and ID signal that are digital signals so as to output the converted data and signal to the control unit;

a DC/DC conversion unit for increasing a voltage of the power supply battery by a predetermined level;

an RF module unit for, on the basis of the short range wireless technology that supports a wireless personal area network and a wireless local area network, converting the RF control data and the ID signal outputted from the control unit into an RF signal, amplifying the RF signal by the predetermined level according to the voltage increased in the DC/DC conversion unit and outputting the amplified signal to the power supply line duplexer antenna, or for amplifying the RF signal received through the power supply line duplexer antenna by a predetermined level according to the voltage increased in the DC/DC conversion unit, removing the noise and outputting the noise removed signal to the A/D conversion unit;

a control unit for recognizing a carrier signal extracted from the power supply line duplexer antenna as an enable signal for transmitting an RF signal and outputting RF control data corresponding to communication data outputted from the A/D conversion unit together with an ID signal set in a switch unit to the RF module unit and outputting communication data corresponding to RF control data outputted from the A/D conversion unit to control unit of the corresponding data communication unit according to whether or not the ID 9 signal is identified;

a radio frequency identification chip unit for storing ID signal information of each of data communication apparatuses set in a switch unit and signal information in each of frequencies used in each of the data communication apparatuses and outputting the stored signal information through the antenna when receiving an effective frequency;

a switch unit for setting On/Off operation modes of the battery modem and setting an ID signal to identify each of the data communication apparatuses; and a display unit and a buzzer unit for displaying and indicating whether or not the RF signal is transmitted.

5. The battery modem according to claim 4, further including an external memory for storing an ID signal set by the switch unit or various kinds of data, and performing a backup function, in addition to a memory in the control unit.

6. The battery modem according to claim 4, wherein the antenna of the radio frequency identification chip unit is formed on the package surface of the battery modem.

* * * * *

UNITED STATES PATENT AND TRADEMARK OFFICE
CERTIFICATE OF CORRECTION

| | | |
|---|---|---|
| PATENT NO. | : 7,181,164 B2 | Page 1 of 1 |
| APPLICATION NO. | : 11/035497 | |
| DATED | : February 20, 2007 | |
| INVENTOR(S) | : Sung-Sub Lee and Gab-Ju Jung | |

It is certified that error appears in the above-identified patent and that said Letters Patent is hereby corrected as shown below:

On the Title Page, Item (73) – "Assignee: Scoby Electronics Co., Ltd.," replace "Scoby" with -- Seoby --

Signed and Sealed this

Eleventh Day of December, 2007

JON W. DUDAS
*Director of the United States Patent and Trademark Office*